US011159665B2

(12) United States Patent
Bai et al.

(10) Patent No.: US 11,159,665 B2
(45) Date of Patent: Oct. 26, 2021

(54) GENERATE USER-FRIENDLY STRING TO REPLACE TELEPHONE NUMBER

(71) Applicant: Lenovo (Singapore) Pte. Ltd., Singapore (SG)

(72) Inventors: Zhenglong Bai, Cary, NC (US); Scott W. Li, Cary, NC (US); Marco Alberto Gonzalez, Durham, NC (US); Matthew Carl Etter, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/776,224

(22) Filed: Jan. 29, 2020

(65) Prior Publication Data

US 2021/0234951 A1    Jul. 29, 2021

(51) Int. Cl.
*H04M 1/57*    (2006.01)
*H04M 1/663*    (2006.01)
(Continued)

(52) U.S. Cl.
CPC .......... *H04M 1/575* (2013.01); *B64C 39/024* (2013.01); *H01Q 1/28* (2013.01); *H01Q 3/24* (2013.01); *H01Q 21/205* (2013.01); *H04B 7/0452* (2013.01); *H04B 7/0617* (2013.01); *H04B 7/0626* (2013.01); *H04B 7/0695* (2013.01);
(Continued)

(58) Field of Classification Search
CPC ............ H04M 1/575; H04M 3/42042; H04M 3/42059; H04M 1/571; H04M 3/42102; H04M 15/06; H04M 1/663; H04M 3/436; H04L 5/0007; H04L 1/20; H04L 1/02; H04L 5/22; B64C 39/024; B64C 2201/027; H04W 36/18; H04W 36/0072; H04W 16/14; H04W 76/27; H04W 16/28; H04W 24/10; H04W 84/06; H04W 4/16; H04W 36/06; H01Q 3/2605; H01Q 21/205; H01Q 1/28; H01Q 3/24; H04B 7/0697; H04B 7/0452; H04B 7/18508; H04B 7/18541; H04B 7/0695; H04B 7/0626; H04B 7/2041; H04B 7/18504; H04B 7/0617
See application file for complete search history.

(56) References Cited

U.S. PATENT DOCUMENTS

2003/0220099 A1*  11/2003  Hama ................... H04M 15/06
                                                                   455/415
2006/0067505 A1*  3/2006  Heinmiller ........... H04Q 3/0037
                                                                   379/229

(Continued)

*Primary Examiner* — Fred A Casca
(74) *Attorney, Agent, or Firm* — Vanleeuwen & Vanleeuwen; Jason A. Friday (57) ABSTRACT

An approach is provided that hides a caller's telephone number and instead displays a user friendly string that acts as an alias for the caller's identity. The approach receives, from a caller using a calling device, an incoming call at a receiving device that is the information handling system such as a smart phone. The incoming call includes a set of textual metadata that includes an alias corresponding to caller as well as the caller's telephone number that corresponds to the calling device. The approach then displays, on a display screen accessible from the receiving device, the alias while inhibiting display of the caller telephone number, thus keeping the caller's actual telephone number hidden from the user of the receiving device.

14 Claims, 7 Drawing Sheets

(51) Int. Cl.
| | | |
|---|---|---|
| *H04W 4/16* | (2009.01) | |
| *H04M 3/436* | (2006.01) | |
| *H04M 3/42* | (2006.01) | |
| *H04B 7/204* | (2006.01) | |
| *H04B 7/06* | (2006.01) | |
| *H04B 7/185* | (2006.01) | |
| *H04W 84/06* | (2009.01) | |
| *H04W 24/10* | (2009.01) | |
| *H04B 7/0452* | (2017.01) | |
| *H04W 76/27* | (2018.01) | |
| *H04W 36/06* | (2009.01) | |
| *H04W 16/28* | (2009.01) | |
| *H01Q 1/28* | (2006.01) | |
| *H04W 16/14* | (2009.01) | |
| *H01Q 21/20* | (2006.01) | |
| *H01Q 3/24* | (2006.01) | |
| *H04W 36/00* | (2009.01) | |
| *H04W 36/18* | (2009.01) | |
| *B64C 39/02* | (2006.01) | |
| *H04L 1/02* | (2006.01) | |
| *H04L 5/00* | (2006.01) | |
| *H04L 5/22* | (2006.01) | |
| *H04L 1/20* | (2006.01) | |
| *H01Q 3/26* | (2006.01) | |

(52) U.S. Cl.
CPC ....... *H04B 7/0697* (2013.01); *H04B 7/18504* (2013.01); *H04B 7/18508* (2013.01); *H04B 7/18541* (2013.01); *H04B 7/2041* (2013.01); *H04L 1/02* (2013.01); *H04L 1/20* (2013.01); *H04L 5/0007* (2013.01); *H04L 5/22* (2013.01); *H04M 1/663* (2013.01); *H04M 3/42042* (2013.01); *H04M 3/42059* (2013.01); *H04M 3/436* (2013.01); *H04W 4/16* (2013.01); *H04W 16/14* (2013.01); *H04W 16/28* (2013.01); *H04W 24/10* (2013.01); *H04W 36/0072* (2013.01); *H04W 36/06* (2013.01); *H04W 36/18* (2013.01); *H04W 76/27* (2018.02); *H04W 84/06* (2013.01); *B64C 2201/027* (2013.01); *H01Q 3/2605* (2013.01)

(56) References Cited

U.S. PATENT DOCUMENTS

| | | | |
|---|---|---|---|
| 2007/0265828 A1* | 11/2007 | Lorraine Scott | G06F 40/263 704/9 |
| 2010/0119048 A1* | 5/2010 | Kobayashi | H04M 3/436 379/112.01 |
| 2011/0047245 A1* | 2/2011 | Abramson | H04M 1/2535 709/219 |
| 2012/0142316 A1* | 6/2012 | Park | H04W 12/02 455/411 |
| 2016/0191707 A1* | 6/2016 | Chen | H04M 19/04 455/415 |
| 2018/0218168 A1* | 8/2018 | Goel | H04L 9/0643 |
| 2018/0288018 A1* | 10/2018 | Cooke | G06F 21/42 |
| 2018/0343336 A1* | 11/2018 | Oh | H04M 1/72555 |

* cited by examiner

GENERATE USER-FRIENDLY STRING TO REPLACE TELEPHONE NUMBER

BACKGROUND

In traditional systems, when members of the public contact a service, such as a ride-sharing service, using a person's mobile telephone, the person's telephone number is often known to the individual that is providing the service as well as the service organization. In some cases, this exposure of a person's telephone number can lead to the telephone number being added to unwanted telephone solicitation lists. In more extreme cases, the exposure of the telephone number can lead to the person receiving unwanted attention, such as being stalked or harassed by the individual that provided the service or some other individual that received the number from the service organization.

SUMMARY

An approach is provided that hides a caller's telephone number and instead displays a user friendly string that acts as an alias for the caller's identity. The approach receives, from a caller using a calling device, an incoming call at a receiving device that is the information handling system such as a smart phone. The incoming call includes a set of textual metadata that includes an alias corresponding to caller as well as the caller's telephone number that corresponds to the calling device. The approach then displays, on a display screen accessible from the receiving device, the alias while inhibiting display of the caller telephone number, thus keeping the caller's actual telephone number hidden from the user of the receiving device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The figures show an approach that hides a caller's telephone number from a receiver by inhibiting display of the caller's telephone number on the receiver's display. The approach operates by having the receiver device store the caller's telephone number in the receiver device memory in a manner that inhibits direct access by a user of the receiver device, such as by encrypting the caller's telephone number. The encrypted caller's telephone number is associated with a textual handle, or alias, of the caller. In addition, the caller can provide retention information to the receiver device so that the encrypted telephone number and caller alias are erased from the receiver device memory after a period of time. This hiding of the caller's telephone number and ability to set a retention time helps protect the caller from unwanted contact by the receiver, such as being added to telephone solicitation lists or from being harassed or otherwise stalked by the receiver.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
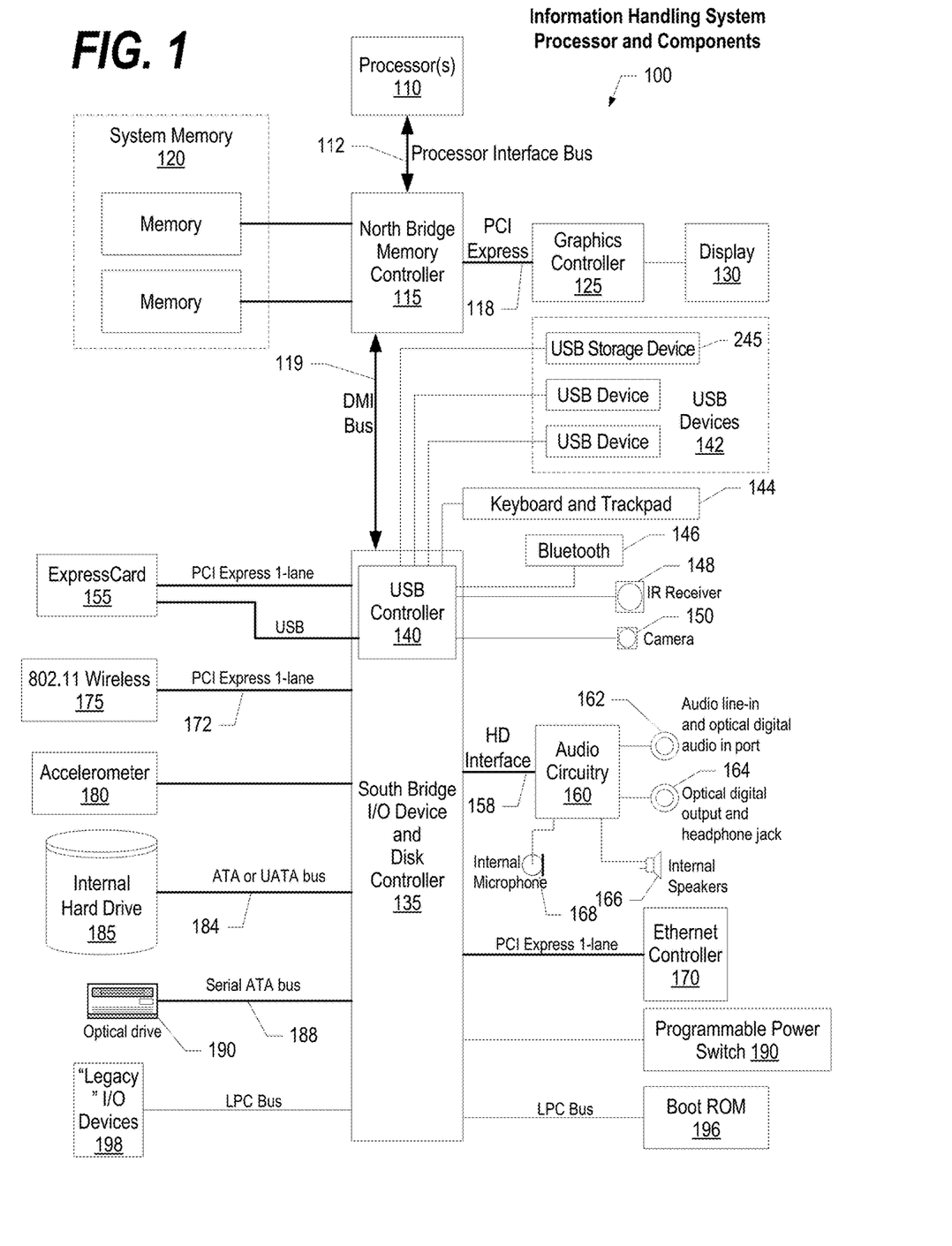
FIG. 1 is a block diagram of a data processing system in which the methods described herein can be implemented.
Figure 2:
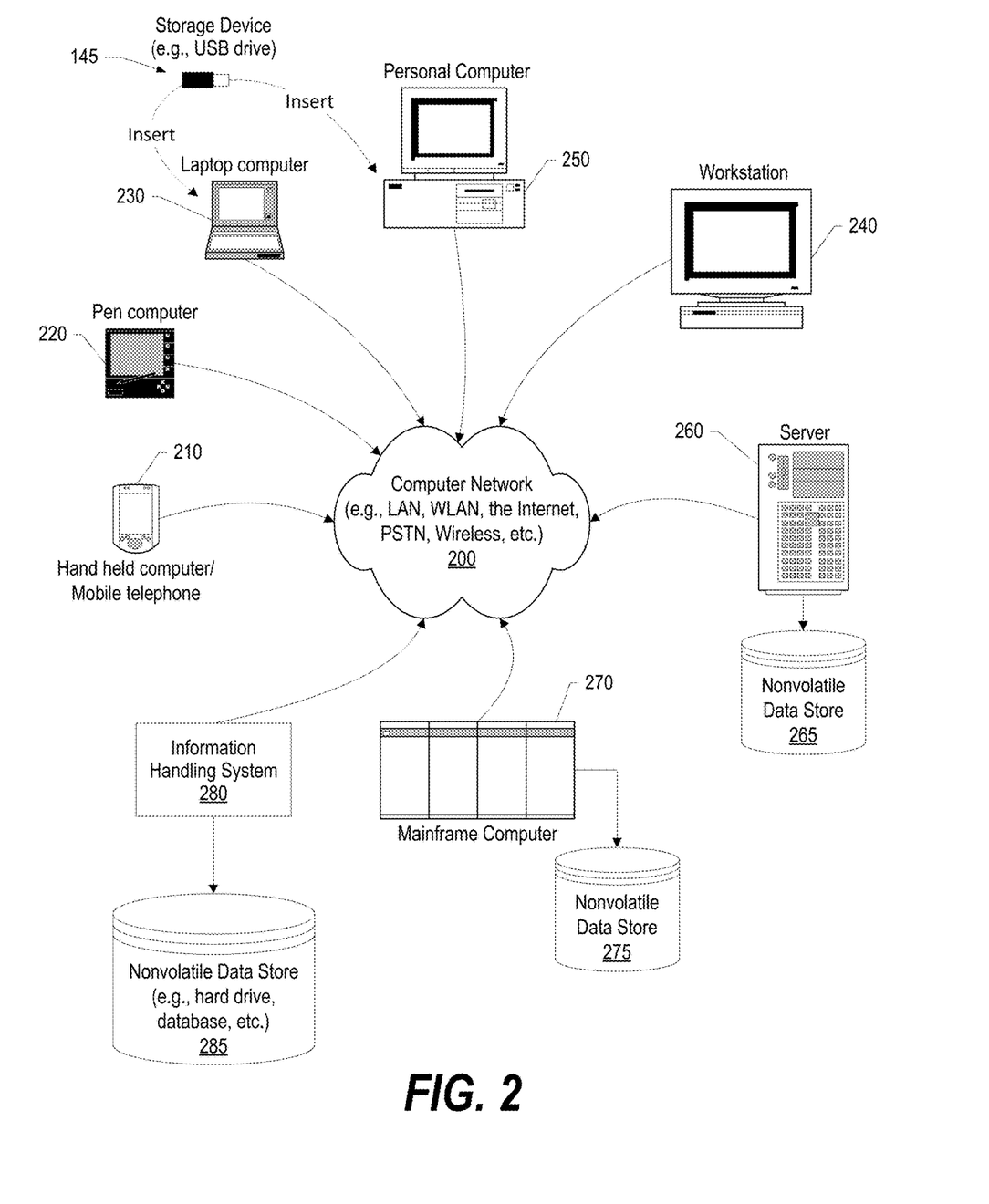
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
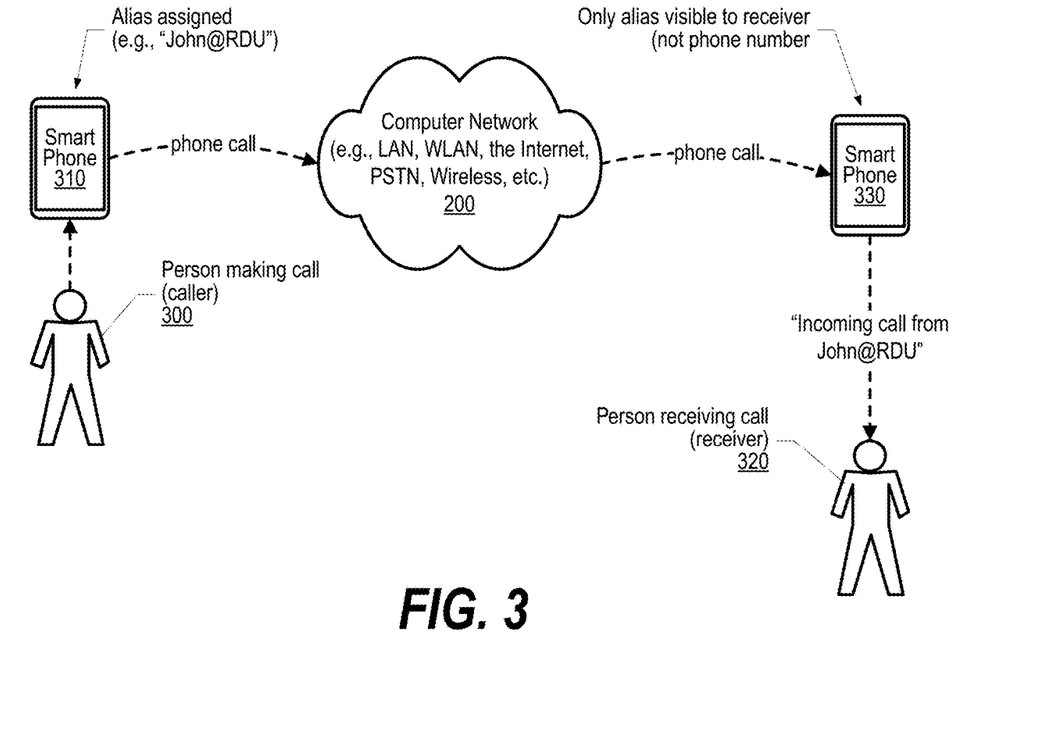
FIG. 3 is a component diagram depicting the components used in inhibiting display of a caller's telephone number and displaying a user friendly string that acts as an alias for the caller's identity.

FIG. 3 is a component diagram depicting the components used in inhibiting display of a caller's telephone number and displaying a user friendly string that acts as an alias for the caller's identity. Caller 300 is a person that is making a call to receiver 320 with caller 320 wishing to inhibit the receiver from knowing the caller's actual telephone number. In one embodiment, an app is utilized by both caller and receiver with the app, such as an app that uses a cellular telephone network or public computer network, such as the Internet, to connect callers and receivers.

Caller 300 establishes an "alias" that will be displayed on the receiver's device rather than displaying the caller's actual telephone number. Caller 300 utilizes calling device 310, such as a smart phone, to access the app to initiate the call as well as to provide metadata, such as the alias of the caller, that will be transmitted to the receiving device. In addition, other metadata, such as a retention time, can also be included in the call. A retention time is used to establish the amount of time the receiver can utilize the alias to contact the caller, such as by using a text message or return telephone call. A default retention time, such as one day, etc. can also be established if the caller does not select a retention time.

Caller 300 contacts, or calls, receiver 320 by having calling device 310, such as a smart phone utilized by the caller, call the receiver's receiving device 330, such as another smart phone that is utilized by the receiver. The receiver receives an incoming call that indicates a call from the alias, rather than displaying the caller's actual telephone number on the display of the receiving device. The receiver can answer the call and discussion, or text messages, between caller and receiver take place as traditionally performed.

In one embodiment, if the retention time has not expired, the receiver can initiate a second contact to the caller by selecting the caller's alias without knowledge of the caller's actual phone number. For example, if the caller and receiver are using a ride sharing app that allows telephone and text messaging between the caller, a ride sharing customer, and the receiver, a ride sharing driver, then the caller can call the driver without disclosing the caller's telephone number, such as particular pick up information. Further to the example, if the driver cannot find the pick up location described by the customer, the driver can select the alias to call or send a text message to the caller without the driver needing or viewing the caller's actual telephone number.

Figure 4:
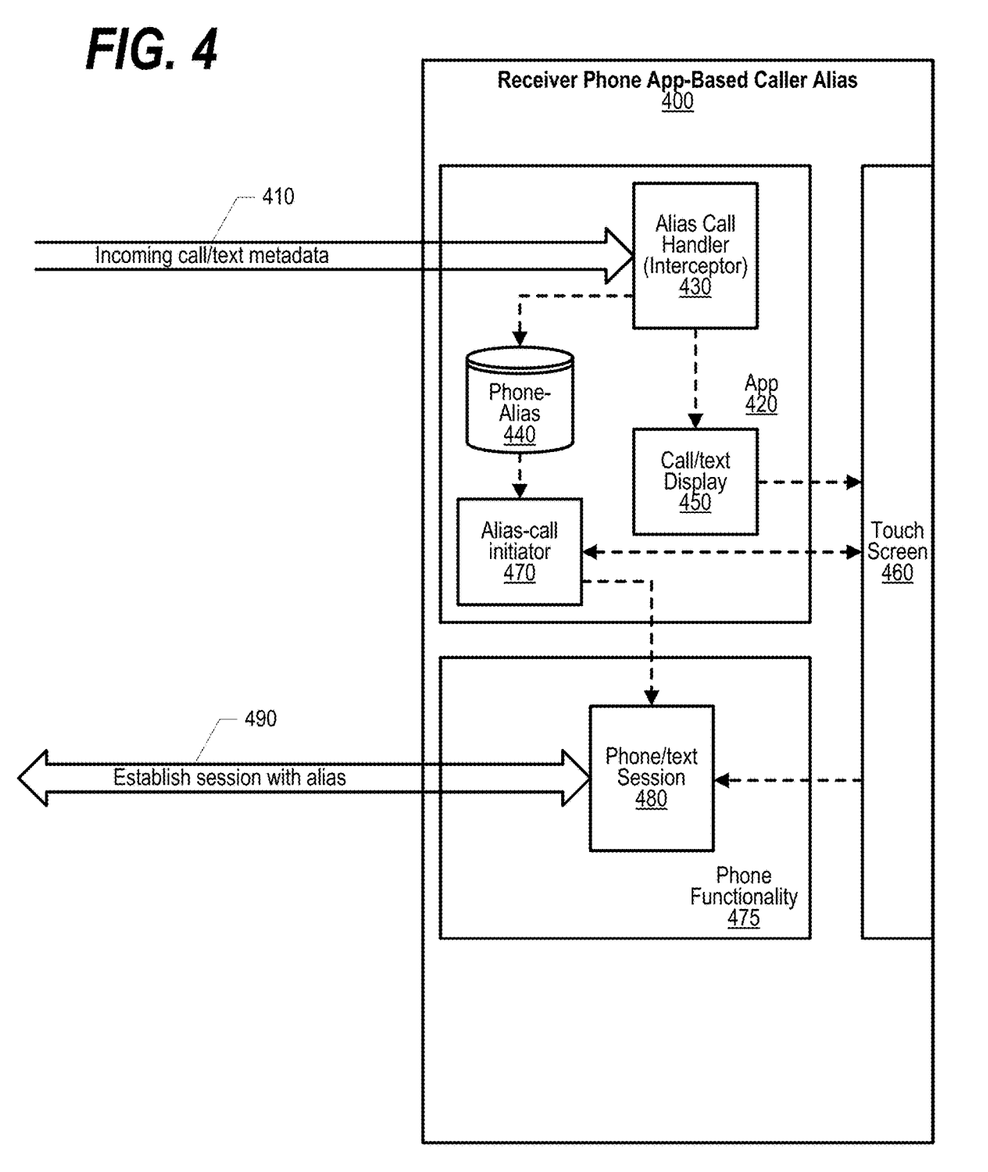
FIG. 4 is a diagram showing processes and data stores used at the receiving device to inhibit display of a caller's telephone number.

FIG. 4 is a diagram showing processes and data stores used at the receiving device to inhibit display of a caller's telephone number. The receiving device operates receiver phone app-based caller alias system 400 to communicate with a caller without exposing the caller's telephone number to the receiver. The caller initiates the communication session by transmitting an incoming call or text message to the receiving device with the incoming call including a set of textual metadata that includes an alias corresponding to the caller, the caller's actual telephone number (which is not displayed on the receiving device's touch screen 460), and an optional retention time that indicates the amount of time that the receiver is allowed to use the caller's alias to initiate communications back to the caller.

App 420 is installed on the receiving device with the app including alias call handler process 430 that intercepts the incoming call and stores the caller's telephone number, alias, and any other textual metadata into data store 440. The caller's actual telephone number is stored in a manner that inhibits direct access or viewing of the caller's telephone number by the receiver, such as by encrypting the actual telephone number and associating the encrypted telephone number with the alias. App 420 also includes call/text display process 450 that displays the caller's alias and other information from the caller (e.g., text messages, etc.) onto receiving device's touch screen 460 while inhibiting display of the caller's actual telephone number. Data store 440 also includes any retention time set for the caller's alias. This allows the user of the receiving device operating system 400 to initiate a call or text message to the caller's device until the retention time has expired. When the retention time expires, the caller's data (encrypted phone number and associated alias) are erased from data store 440.

To initiate a return call or message from the receiving device back to the calling device, the receiver, such as the ride share driver, selects the alias of the caller on the device's touch screen display 460. App 420 includes alias-call initiator process 470 that is used to decrypt the caller's actual telephone number from data store 440 and use the decrypted telephone number to contact the caller without displaying the caller's actual telephone number on receiving device's touch screen display 460. Telephone functionality 475, such as app-based phone functionality or traditional phone functionality, includes phone/text session process 480 that establishes a second session initiated by the receiver back to the caller, shown as session with alias 490.

Figure 5:
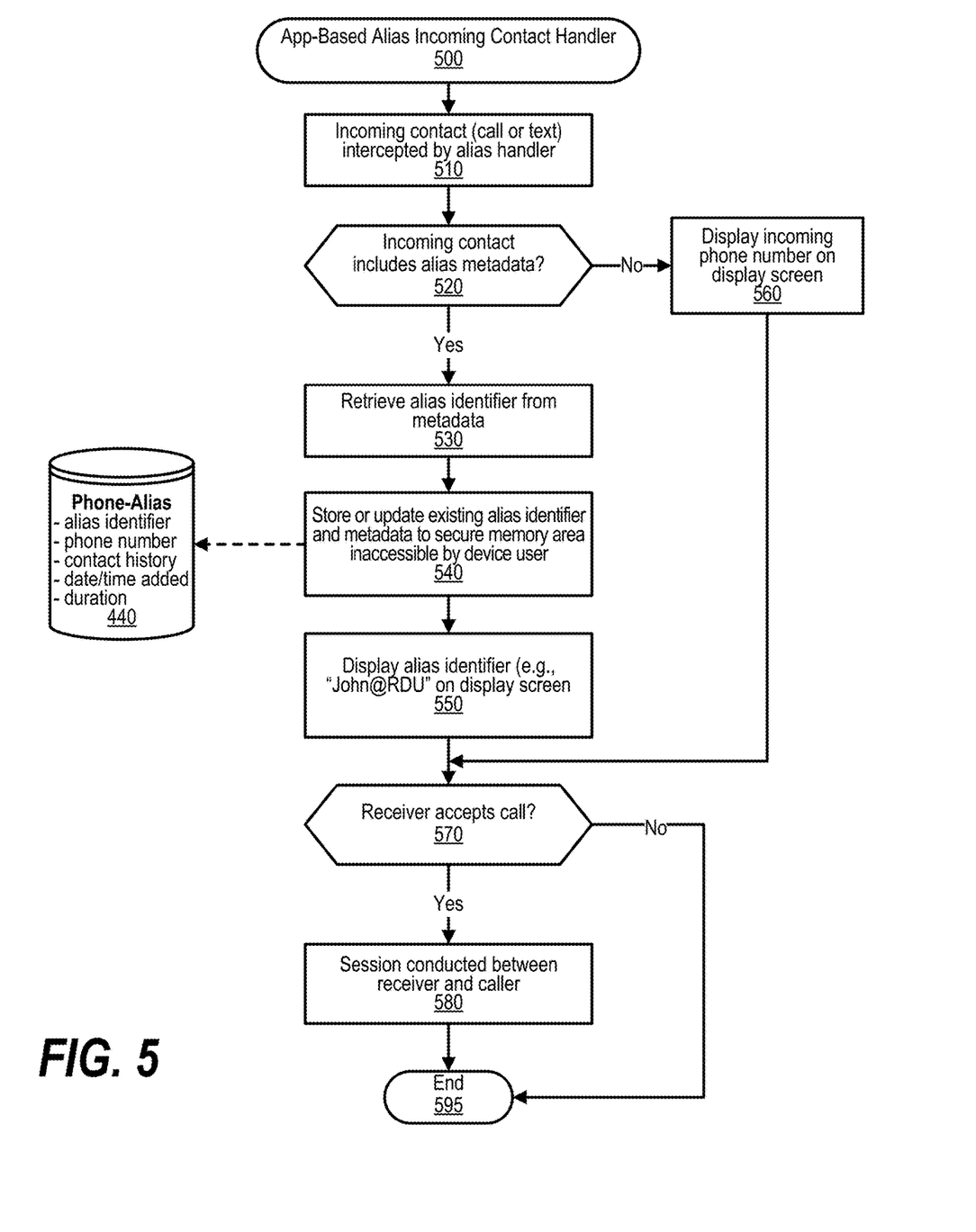
FIG. 5 is a flowchart showing steps taken by a app-based alias incoming contact handler.

FIG. 5 is a flowchart showing steps taken by a app-based alias incoming contact handler. FIG. 5 processing commences at 500 and shows the steps taken by a process that runs an app-based alias incoming contact handler. At step 510, the process receives an incoming contact (call or text) that is intercepted by alias handler. The process determines as to whether the incoming contact includes a set of textual metadata that includes an alias corresponding to the caller (decision 520). If the incoming contact includes a set of textual metadata that includes an alias corresponding to the caller, then decision 520 branches to the 'yes' branch to perform steps 530 through 550. On the other hand, if the incoming contact does not include a set of textual metadata that includes an alias corresponding to the caller and is instead a traditional telephone call, then decision 520 branches to the 'no' branch whereupon, at step 560 the process displays the caller's incoming phone number on the receiving device's display screen.

Steps 530 through 550 are performed when the incoming call includes an alias to use in lieu of the caller's actual telephone number. At step 530, the process retrieves an alias from the set of textual metadata (e.g., "John@airport", etc.). At step 540, the process stores (or updates an existing alias identifier) in data store 440 and also associates and stores textual metadata to a secure memory area inaccessible by device user. In one embodiment, the caller's actual telephone number is encrypted and the encrypted phone number is associated with the caller's alias. At step 550, the process displays the caller's alias identifier (e.g., "John@airport" on the receiver's display screen.

The process determines whether the receiver accepts or declines the incoming call (decision 570). If the receiver accepts the call, then decision 570 branches to the 'yes' branch whereupon, at step 580, a session (text message or telephone) is conducted between the receiver's receiving device (e.g., smart phone, etc.) and the caller's calling device (e.g., another smart phone, etc.). On the other hand, if the receiver declines the call, then decision 570 branches to the 'no' branch bypassing step 580. At step 595, the process ends.

Figure 6:
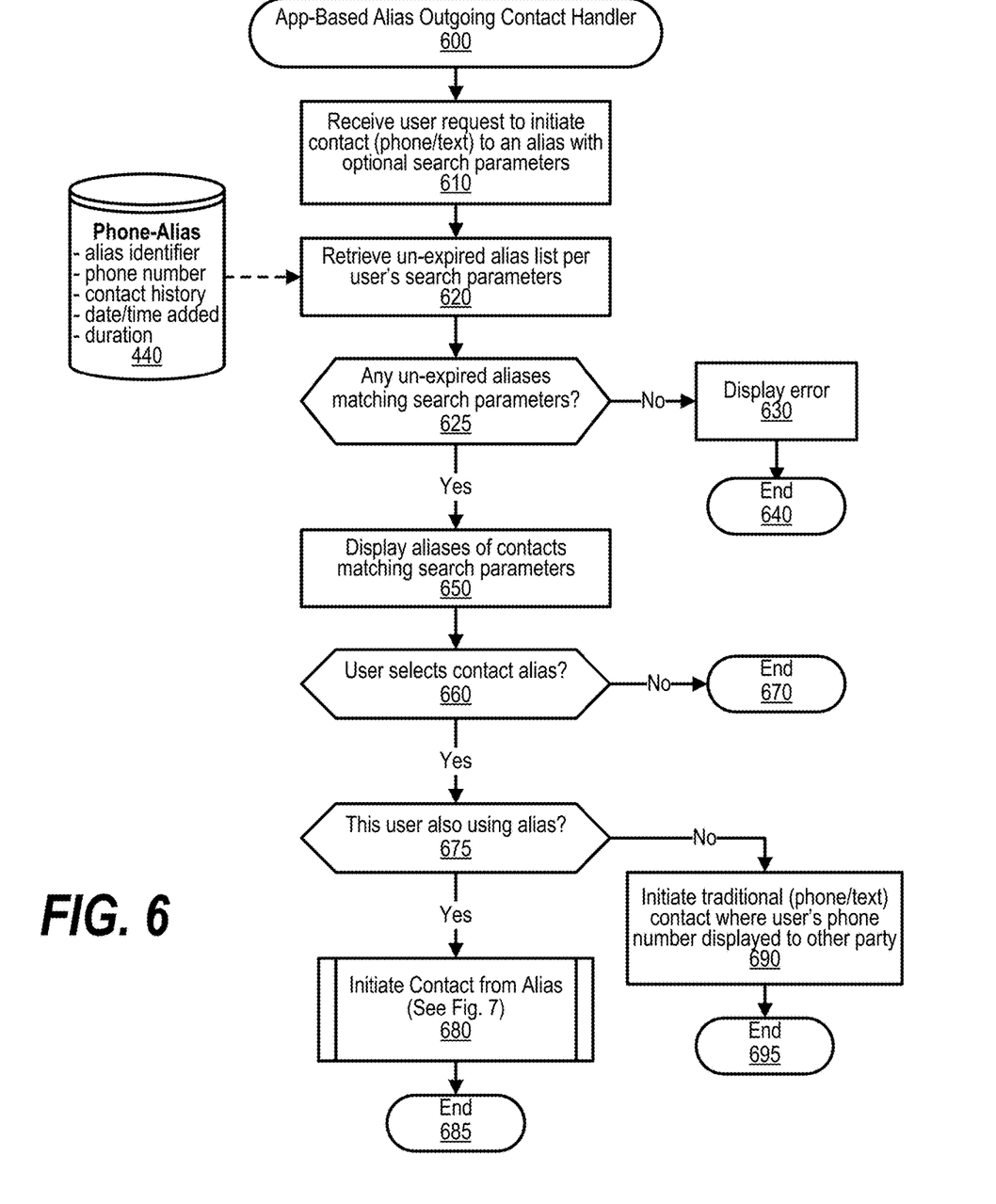
FIG. 6 is a flowchart showing steps taken by a app-based alias outgoing contact handler.

FIG. 6 is a flowchart showing steps taken by a app-based alias outgoing contact handler. FIG. 6 processing commences at 600 and shows the steps taken by a process that performs an app-based alias outgoing contact handler. At step 610, the process receives the user's request to initiate contact (phone/text) to an alias with optional contact search parameters. At step 620, the process retrieves any un-expired aliases in a list per the user's contact search parameters. The phone-alias list that is searched is retrieved from data store 440. In one embodiment, the phone number included in data store 440 is encrypted to prevent the user or someone else from viewing the actual telephone number. The "duration" listed in data store 440 is a retention time that is the amount of time that the alias is accessible. When the retention time expires, the alias is not retrievable and, alternatively, may be erased from data store 440.

The process determines as to whether any un-expired aliases that match the contact search parameters were retrieved (decision 625). If any un-expired aliases that match the contact search parameters were retrieved, then decision 625 branches to the 'yes' branch for further processing. On the other hand, if no un-expired aliases matching search parameters were found, then decision 625 branches to the 'no' branch whereupon, at step 630 an error is displayed (e.g., "no contacts found," etc.) and processing ends at 630.

If one or more aliases were found matching the search parameters then, at step 650, the process displays the list of aliases of contacts matching the contact search parameters. The process determines as to whether the user selects one of the contact aliases to initiate contact (decision 660). If the user selects one of the listed contact aliases, then decision 660 branches to the 'yes' branch for further processing. On the other hand, if the user does not select a alias from the list, then decision 660 branches to the 'no' branch and processing ends at 670.

The process determines as to whether this user (the person that is now making a call or text) is also using an alias to protect their telephone number from disclosure (decision 675). If this user is also using an alias, then decision 675 branches to the 'yes' branch whereupon, at predefined process 680, the process performs the Initiate Contact from Alias routine (see FIG. 7 and corresponding text for processing details) and processing ends at 685. On the other hand, if this user is not using alias, then decision 675 branches to the 'no' branch whereupon, at step 690, the process initiates a traditional (phone/text) contact where this user's phone number is displayed on the other party's device (e.g., on the other party's smart phone screen, etc.) and processing ends at 695.

Figure 7:
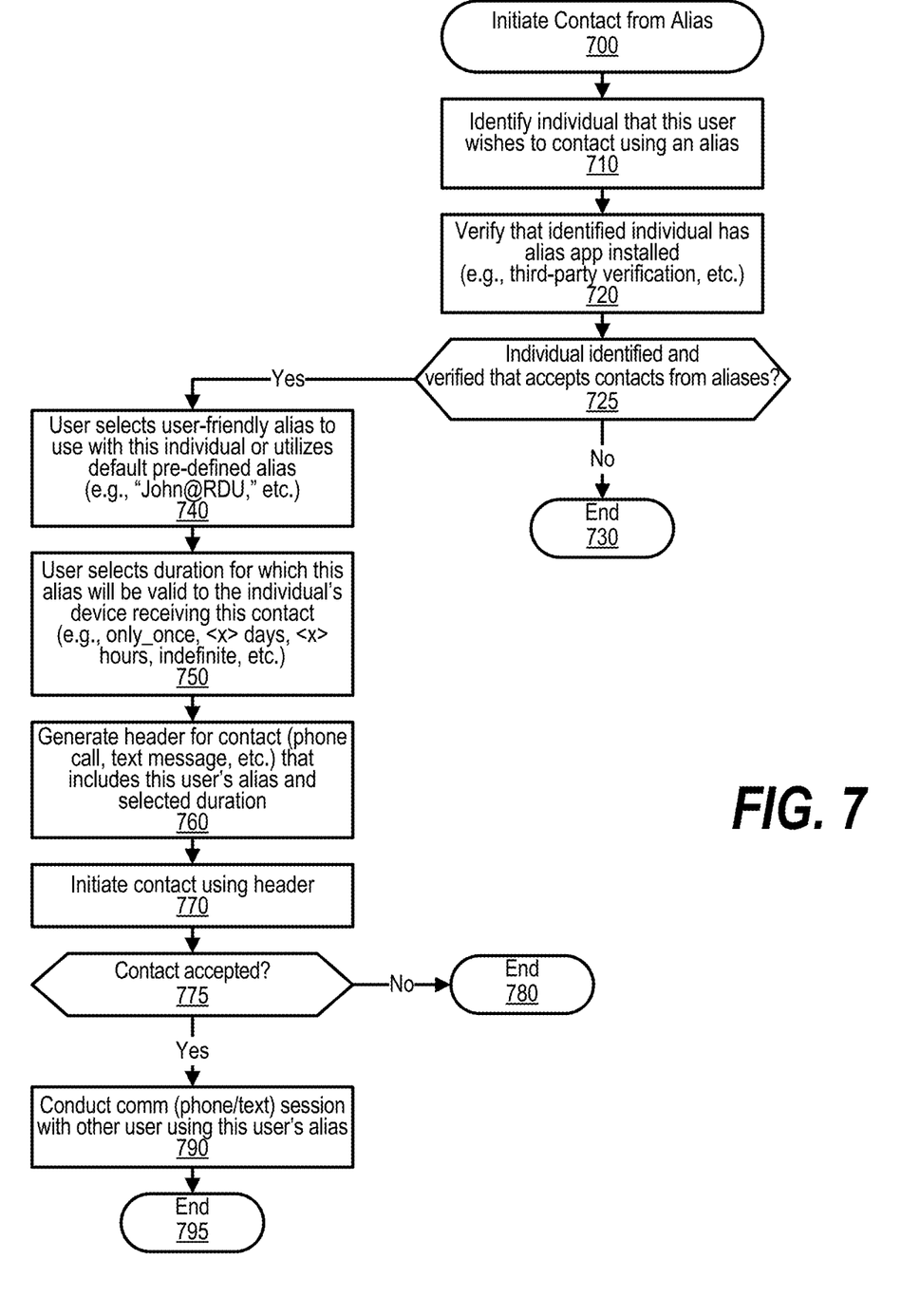
FIG. 7 is a flowchart showing steps taken by a process initiates contact with another device using an alias.

FIG. 7 is a flowchart showing steps taken by a process initiates contact with another device using an alias. FIG. 7 processing commences at 700 and shows the steps taken by a process that initiates contact from a user (caller) that wishes to have an alias displayed on the receiving device rather than this caller's actual telephone number. At step 710, the process identifies the individual (receiver) that this user wishes to contact using an alias. At step 720, the process verifies that the identified individual has an alias app installed (e.g., third-party verification, both parties using same app with alias functionality, etc.).

The process determines as to whether the individual is identified and verified as accepting contacts from aliases (decision 725). If the individual is identified and verified as accepting contacts from aliases, then decision 725 branches to the 'yes' branch to perform steps 740 through 795. On the other hand, if the individual being called is not identified or is not verified as accepting contacts from aliases, then decision 725 branches to the 'no' branch and processing ends at 730.

Steps 740 through 795 are performed when the receiver has been identified and verified as accepting calls from aliases rather than just from telephone numbers. At step 740, the user selects a user-friendly alias to use with this individual or utilizes a default pre-defined alias (e.g., "John@Raleigh," etc.). At step 750, the users selects a retention time (duration) for which this alias will be valid to the individual's device that is receiving this contact information (e.g., only_once, <x> days, <x> hours, indefinite, etc.). At step 760, the process generates a header that includes a set of textual metadata for contact the contact (phone call, text message, etc.) with the textual metadata including this user's alias and selected duration. In one embodiment, the textual metadata also includes this caller's telephone number even though the caller's telephone number will not be displayed to the receiver on the receiving device.

At step 770, the process initiates contact using the textual metadata that is included in the header of the text message or telephone call. The process determines whether the receiver accepted this telephone call or text message (decision 775). If accepted by the receiver, then decision 775 branches to the 'yes' branch whereupon, at step 790, the process conducts communication (telephone call or text message) session with the other user (the receiving device) using this user's alias rather than this user's actual telephone number and processing ends at 795. On the other hand, if the receiver does not accept the contact, then decision 775 branches to the 'no' branch and processing ends at 780.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system comprising a processor, a memory accessible by the processor, and a network interface connecting the information handling system to a network, the method comprising:
   receiving, from a caller using a calling device, an incoming call at a receiving device that is a user device that is the information handling system, wherein the incoming call is accepted by the receiving device and includes a set of textual metadata that includes an alias corresponding to caller and a caller telephone number corresponding to the calling device;
   executing a hash function against the caller telephone number, the hash function resulting in a hash value representation;
   storing the hash value representation of the caller telephone number in the memory of the receiving device so that the caller telephone number is inaccessible by a user of the receiving device; and
   displaying, on a display screen accessible from the receiving device, the alias while inhibiting display of the caller telephone number.

2. The method of claim 1 further comprising:
   encrypting the caller telephone number;
   storing the alias corresponding to the caller and the encrypted caller telephone number in the memory of the device; and
   wiping the received caller telephone number from the memory of the device.

3. The method of claim 2 further comprising:
   receiving a retention time included in the set of textual metadata; and
   erasing the stored alias and the encrypted caller telephone number from the memory after the retention time expires.

4. The method of claim 2 further comprising:
   receiving a request at the receiving device to contact the caller based on a selection of the alias at the receiving device;
   decrypting the stored encrypted caller telephone number that corresponds to the selected alias, the decrypting resulting in a decrypted caller telephone number; and
   initiating a contact with the caller from the receiving device using the decrypted caller telephone number while inhibiting display of the decrypted caller telephone number at the receiving device.

5. The method of claim 4 wherein the contact is a selected from the group consisting of a mobile telephone call and a text message.

6. An information handling system comprising:
   one or more processors;
   a memory coupled to at least one of the processors;
   a network interface that connects the information handling system to a computer network; and
   a set of computer program instructions stored in the memory and executed by at least one of the processors in order to perform actions comprising:
      receiving, from a caller using a calling device, an incoming call at a receiving device that is a user device that is the information handling system, wherein the incoming call is accepted by the receiving device and includes a set of textual metadata that includes an alias corresponding to caller and a caller telephone number corresponding to the calling device;

executing a hash function against the caller telephone number, the hash function resulting in a hash value representation;

storing the hash value representation of the caller telephone number in the memory of the receiving device so that the caller telephone number is inaccessible by a user of the receiving device; and displaying, on a display screen accessible from the receiving device, the alias while inhibiting display of the caller telephone number.

7. The information handling system of claim 6 wherein the actions further comprise:

encrypting the caller telephone number;

storing the alias corresponding to the caller and the encrypted caller telephone number in the memory of the device; and wiping the received caller telephone number from the memory of the device.

8. The information handling system of claim 7 wherein the actions further comprise:

receiving a retention time included in the set of textual metadata; and erasing the stored alias and the encrypted caller telephone number from the memory after the retention time expires.

9. The information handling system of claim 7 wherein the actions further comprise:

receiving a request at the receiving device to contact the caller based on a selection of the alias at the receiving device;

decrypting the stored encrypted caller telephone number that corresponds to the selected alias, the decrypting resulting in a decrypted caller telephone number; and initiating a contact with the caller from the receiving device using the decrypted caller telephone number while inhibiting display of the decrypted caller telephone number at the receiving device.

10. The information handling system of claim 8 wherein the contact is a selected from the group consisting of a mobile telephone call and a text message.

11. A computer program product comprising:

a computer readable storage medium, comprising computer program code that, when executed by an information handling system, executes actions comprising:

receiving, from a caller using a calling device, an incoming call at a receiving device that is a user device that is the information handling system, wherein the incoming call is accepted by the receiving device and includes a set of textual metadata that includes an alias corresponding to caller and a caller telephone number corresponding to the calling device;

executing a hash function against the caller telephone number, the hash function resulting in a hash value representation;

storing the hash value representation of the caller telephone number in the memory of the receiving device so that the caller telephone number is inaccessible by a user of the receiving device; and displaying, on a display screen accessible from the receiving device, the alias while inhibiting display of the caller telephone number.

12. The computer program product of claim 11 wherein the actions further comprise:

encrypting the caller telephone number;

storing the alias corresponding to the caller and the encrypted caller telephone number in the memory of the device; and wiping the received caller telephone number from the memory of the device.

13. The computer program product of claim 12 wherein the actions further comprise:

receiving a retention time included in the set of textual metadata; and erasing the stored alias and the encrypted caller telephone number from the memory after the retention time expires.

14. The computer program product of claim 12 wherein the actions further comprise:

receiving a request at the receiving device to contact the caller based on a selection of the alias at the receiving device;

decrypting the stored encrypted caller telephone number that corresponds to the selected alias, the decrypting resulting in a decrypted caller telephone number; and initiating a contact with the caller from the receiving device using the decrypted caller telephone number while inhibiting display of the decrypted caller telephone number at the receiving device, wherein the contact is a selected from the group consisting of a mobile telephone call and a text message.

* * * * *